Figure 1:
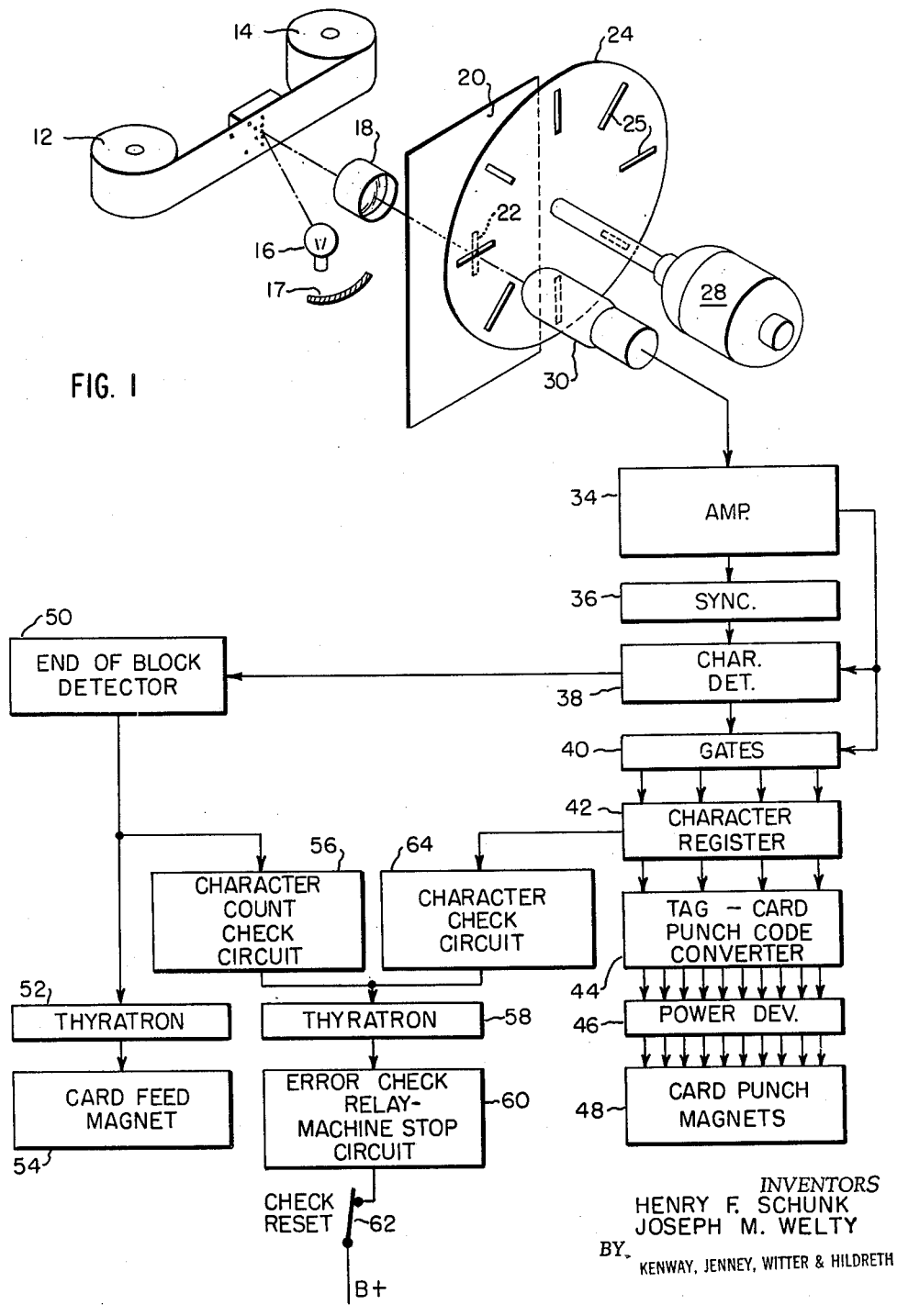

April 9, 1963 H. F. SCHUNK ETAL 3,084,854
DATA PROCESSING SYSTEM
Filed June 1, 1959 2 Sheets-Sheet 1

INVENTORS
HENRY F. SCHUNK
JOSEPH M. WELTY
BY KENWAY, JENNEY, WITTER & HILDRETH
ATTORNEYS

United States Patent Office 3,084,854
Patented Apr. 9, 1963

3,084,854
DATA PROCESSING SYSTEM
Henry F. Schunk, Wakefield, and Joseph M. Welty, Natick, Mass., assignors to Automatic Records, Inc., Natick, Mass., a corporation of Massachusetts
Filed June 1, 1959, Ser. No. 817,228
7 Claims. (Cl. 234—33)

This invention relates in general to data processing systems and in particular to a system for accumulating data at multiple points of occurrence of business transactions and converting that data into useful form at a central control point.

For their efficient operation most businesses are quite dependent upon accurate and up-to-the-minute records. In the operation of a large retail enterprise, perhaps more than in any other area, record keeping is of vital concern and is also a task of considerable proportions. The magnitude of the task can best be appreciated by considering the fact that the majority of the employees in a retail enterprise are engaged in the making of transactions during their entire working day. Practically every transaction or sale is unique in that either a different customer or a different item is involved. Furthermore, any one of a multitude of salespersons may be a party to the making of the transaction or sale.

These generalities are immediately related to the specific problems of control of inventory to maintain an adequate supply of needed items, prompt and accurate billing of customers, and evaluation of the personnel involved in making the sales. It would, of course, also be desirable to obtain as much merchandising data as possible at the points of sale. If sufficient data could be accumulated accurately and promptly and finally collected at a central point for transfer to tabulating cards or other useful records, an enormous saving would be realized.

The potential savings have not gone unrecognized. Several data processing systems have been developed, and there are continuing efforts being made to mechanize retail record keeping. Most of the known systems utilize a punched card in the form of a tag which is attached to the item being sold. The tag carries, coded by means of punched holes, the necessary data for the item to which it is attached. The tag is removed after the sale and the information contained on the card is read by some type or another of reading device. The information thus obtained is carried to tabulating machines in the accounting department by punched paper tapes or by other means. Operators of the tabulating machines record the information by depressing proper keys of card punching machines to record the data obtained. In other systems the tickets attached to the items sold have been made in two or three parts. At the time of sale, the salesperson removes at least one of the parts which is then sent to the accounting department where it is translated into desired information on a hand-operated card punch machine. There have been some attempts made to translate the information automatically from tag to punch card, but a persistent problem has arisen because tags are frequently torn or bent in handling and the automatic machinery has been unable to cope with such material.

It would appear to be an obvious improvement on this system to merely use the tabulating cards as a part of the price tags and thus avoid the labor and time of transferring information from the one card to the other. However, this has not been possible because the tabulating cards are much too large for such use and, furthermore, are of far higher cost than would be permissible for their use as price tags.

Still other systems have been developed which utilize three-part identification tags. The three-part tags were designed to provide one portion for the merchandise itself, one for the customer and one for the salesperson. The various sections carry printed descriptive matter where needed, and coded holes punched into the tags for the use of the store. A recorder is operated by the salesperson to read the information coded on the tag and to transmit that information over telephone wires to a central recording area. It was also attempted to build a machine at the central recording area to translate the signals received into punched holes in tabulating cards. Despite all the effort expended in attempts to solve the record-keeping problem, there are still no completely successful automatic record-keeping installations in any large department store.

The reasons for the failure of any of the proposed systems to obtain widespread acceptance are numerous. One basic error in many of the proposed systems, is the use of a recorder at the point of sale which utilizes punched paper tape. Here, the cost of the recorder is great and the possibilities of mechanical and human error rule out the punched paper tape as a source of data for customer billing. In other systems which were developed and operated on a more mechanized basis, the possiblities of human and mechanical error were considerably lessened. Unfortunately, however, the highly mechanized systems have for the most part been prohibitive in cost and psychologically unacceptable inasmuch as their method of operation constituted a complete departure from known methods. Installation of such systems would require the abandonment of most of the presently used tabulating equipment. The radical nature of these changes has worked against the adoption of such equipment by retailers.

It is, therefore, an object of the present invention to provide a data processing system in which data is converted from punched paper tags to a thermo-chromatically responsive medium such as heat-sensitive tape, to tabulating cards.

It is another object of the present invention to provide a data processing system which is accurate, automatic, and foolproof.

It is still another object of the present invention to provide inexpensive data recording and accumulating devices for use at points of sale.

It is still another object of the present invention to provide a data-processing system capable of operation even with bent and mutilated tags.

It is a further object of the present invention to provide a system which is capable of utilization with existing tabulating machinery.

It is a still further object of the present invention to provide a data processing system having built-in check circuits to eliminate mistakes in record keeping.

In general, the present invention consists in a system which utilizes a single part, punched paper tag which is attached to each item. Information on the item is carried by the tag in the form of coded punched holes. When a sale is made, the tag is merely inserted into a recorder which makes a direct impression of the coded data on the tag on a thermo-chromatically responsive medium such as heat-sensitive tape. The use of such a medium causes the formation of dark areas wherever the medium is not shielded from direct impingement of heat rays. In the case of heat-sensitive tape such as used in the present invention, the impression consists of dark spots formed on the tape at points corresponding to the punched holes in the tag. At the end of a business day, or at any other convenient time, the heat-sensitive tape, which is accumulated on a reel as impressions are made, is removed from the recorder and loaded on a converter which automatically produces tabulating cards carrying information derived from and corresponding to the data on the heat-sensitive tape.

The converter includes a light source, the output of which is reflected off the heat-sensitive tape through a lens system and a mechanical scanner to a photoelectric device. The dark spots on the heat-sensitive paper corresponding to the punched holes in the paper tag reflect less light than the background which has not been directly exposed to the heat source in the recorder. A voltage pulse corresponding to each dark spot is developed in the photoelectric device. After proper synchronization and amplification the various signals from the dark spots which represent characters of data are utilized to fire thyratrons or pick up relays. Each thyratron or relay represents a particular character and as each thyratron fires or relay energizes, its associated punch magnet in the tabulating machine is energized. The same result that would be produced by manually depressing a character key of the tabulating machine is thus automatically produced. Circuits for discriminating against spurious signals and check circuits are provided in the converter to assure that only valid characters are punched, and that the proper number of characters is punched in each card.

Figure 2:
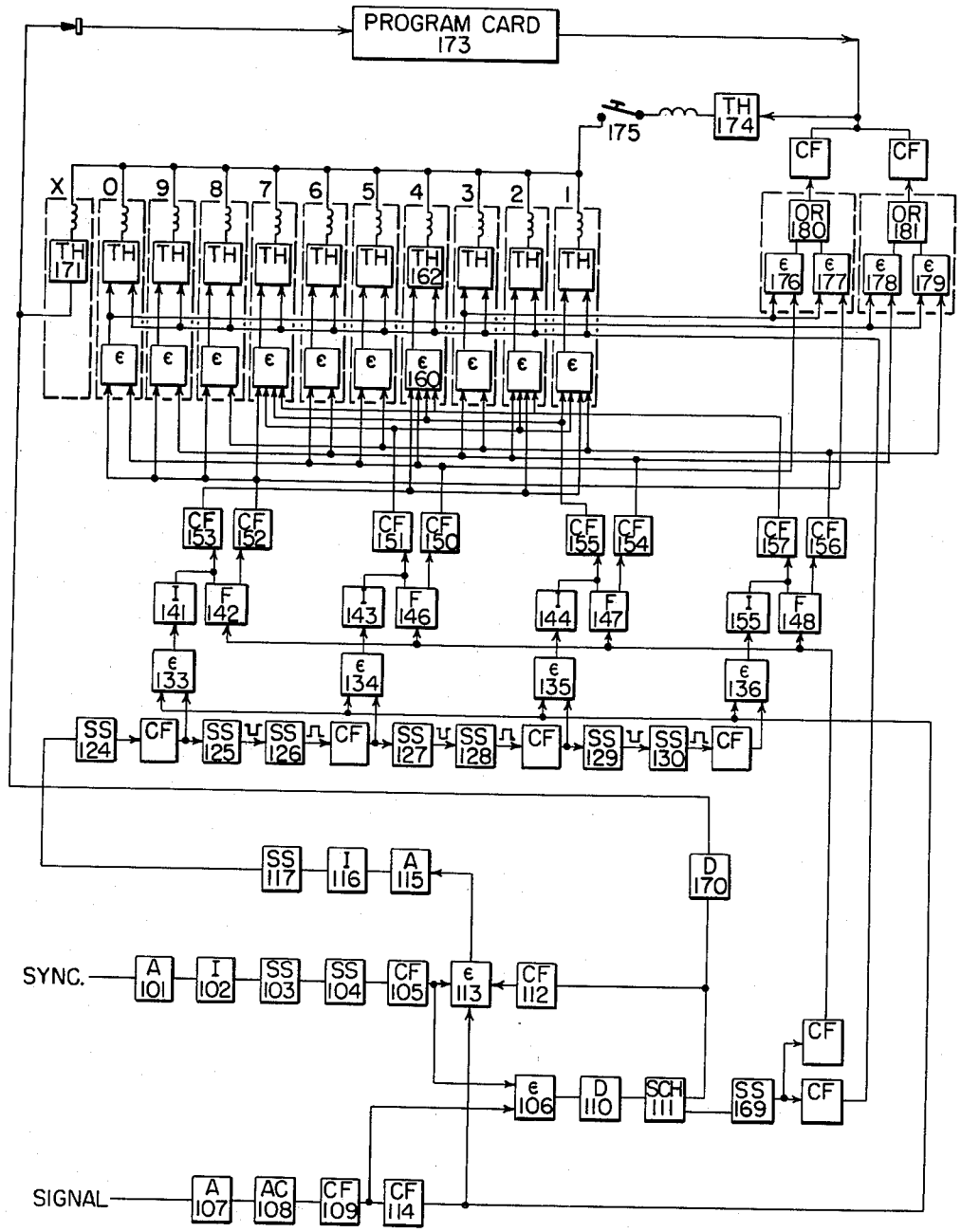

These and other objects and features of the invention will be more readily understood and appreciated from the following detailed description of a preferred embodiment thereof, selected for purposes of illustration and shown in the accompanying drawing, in which:

FIG. 1 is a block diagram and simplified schematic showing of a preferred embodiment of the invention, and FIG. 2 is a detailed block diagram and schematic showing of the converter circuitry used in the embodiment of FIG. 1.

Although the garment tag which bears the information to be recorded and transcribed forms no part of the present invention, it is helpful in understanding the invention to be familiar with one type of tag and the code used with that tag. The tag will be described and shown as having punched holes, but the same data represented by the holes, or other data such as conventional printed data could be inscribed on the tag with a proper ink, such as one having a metal base.

Although any one of a number of codes can be handled in the systems, a typical tag used includes twenty-five data-carrying columns. In each column, a digit from 0 to 9 can be represented by a combination of punched holes. Five levels for punching, or "bits" are provided in each column. One of these levels or bits, which may be designated the zero bit, is utilized in one embodiment of the invention to indicate the presence of a character in any column in which the zero bit is punched. In other words, the zero bit is always punched if a character to be read is also punched in the column.

Alternatively, the presence of two punched holes by and of itself may be utilized to signify the presence of a character. In other words, the presence of two punched holes at any levels of the column serves to indicate the presence of a character.

In either case, a code of the 1, 2, 4, 7 type is preferred. Thus, using the zero punch convention outlined above, the digit "1" in a column is represented by punches in the zero and one levels; the digit "2" by the zero and two; "3" by zero, one and two; "4" by zero and four; "5" by zero, one and four, etc.

Where, as in the second case outlined above, the zero convention is not used, the presence of two and only two punches signifies a character and the zero bit exists only where the code requires it for representation of the digits 1, 2, 4 and 7. That is, the digit "1" is represented by punches in the zero and one levels; "2" by zero and two; "3" by one and two; "4" by zero and four; "5" by one and four, etc.

Zero as a digit is represented by punches in the four and seven levels.

Additional printed data may be carried on the tags and there may also be holes punched for string and for synchronizing purposes as is explained below.

The recorder of the present invention is simple and straightforward in structure. It includes a heat source, a mechanism for indexing heat-sensitive tape past the source, and a receptacle for retaining tags temporarily between the heat source and the tape. An installation of the present invention contemplates a number of such recorders placed about the sales areas of the department store. The simplicity of the recorder permits its inexpensive manufacture and the use of relatively large numbers of recorders without undue expense for a complete installation.

The operation of the recorder is also quite simple. The operator who is the salesperson merely inserts the tag in a slot which is provided in the recorder and a switch is actuated either automatically or by a switch or foot pedal. The switch advances a fresh area of tape to a position where it is masked by the inserted tag. The heat source, which may be an infra-red lamp or other suitable device, is then energized. An impression is formed on the heat-sensitive tape which corresponds to the coded holes in the tape. The tape is carried on reels and after a suitable period, a reel of tape on which impressions have been made is taken from the recorder and delivered to the converting point. This conveniently might be in the accounting department, at which the reels of tape collected from the various recording points are assembled. A description of the operation of the converter will be given in outline with reference to the block diagram of FIG. 1 prior to considering the complete details of apparatus and operation.

First, a roll of tape on which sets of coded dots have been impressed is set up on a spindle as a supply reel 12. A driven take-up reel 14 draws the tape from the supply reel before a light source 16. The light from source 16 may be concentrated on the area of tape in a beam as indicated by the broken line utilizing, for example, a concave mirror 17. Light is reflected from the tape, again as indicated by the broken line, through a lens system 18 to a flying-spot scanning device. The flying-spot scanner includes an enclosing housing. To better illustrate internal components, only a wall 20 of the housing is shown. In the housing wall 20, a vertical slot 22 is formed. Within the housing for the flying-spot scanner is a rotating slotted disc 24. The disc 24 is disposed relative to the slot 22 in the wall of the housing such that the radial slots 25 of the disc scan the length of the vertical slot 22, the radial slots of the disc being at right angles to the slot in the wall 20 midway in their travel down the length of the vertical slot. Rotary power is provided to the disc 24 by means of a motor 28.

Behind the rotating disc and aligned with the lens system 18 is a photoelectric device such as a photoelectric tube 30. The photoelectric device 30 is electrically connected to an amplifier 34.

At this point, it is helpful to consider the conversion process which takes place. The portion of the tape before the slot in the wall 20 is scanned as the radial slots pass. Only the reflected light from the narrow vertical line across the width of the tape reaches the photoelectric tube, the remainder of the tape being masked by the wall 20. Further, only a small portion of that line of reflected light actually falls upon the sensitive area of the photoelectric device at any given instant of time, because of the moving opening provided by the combined fixed vertical and rotating radial slots. The entire width of the tape is, of course, scanned by each slot in the rotating disc 24, however.

The first discontinuity of reflection occurs at the edge of the tape. The difference in reflection between the tape itself and the surrounding apparatus causes the generation of a pulse or spike which may be negative in polarity as the reflection changes from the darker apparatus to the lighter tape. Then, the reflection is next affected by such dark spots as exist at the various levels of the columns. The dark spots, of course, reflect less light than the lighter background resulting in the generation of a voltage pulse for each dot present in the column. These pulses will be positive in polarity as distinguished from the negative pulse occurring as the scanner passes over the leading tape edge.

In the embodiment of the invention outlined above where the zero bit is utilized to indicate the presence of a character to be read, operation of the apparatus is as described immediately below.

The output of the photoelectric tube 30 is fed to an amplifier 34. Although there may in fact be more than one amplifier or amplifying channel, it is sufficient for the broad explanation to consider the amplifier a single unit. Thus, both the negative pulse or spike and the signal pulses from data dark spots are amplified.

The negative sync pulse precedes in time the positive signal pulses, and it is utilized to set up a gate occurring at the exact time the zero bit is presented to a synchronizing circuit 36. The amplified signals from the amplifier 34 are also presented to a valid character detector 38. The character detector includes a capacitor which charges up only as and after coincidence of a gate and pulse occurs numerous times. This is possible because a black spot is scanned a few hundred times by the slotted disc before the spot passes by the scanning area. This operation prevents noise or other spurious signals being mistaken for true data signals. The character detector passes signals in response to valid input to a gate circuit having three inputs, namely, the data signal, the sync pulse and the character detector output. A group of gates 40 are then opened in time sequence at the proper points to pass data signals representing the 7, 4, 2 and 1 digits respectively.

Such digits as appear during the enabling of their respective gates are then passed to a character register 42. The same principle mentioned above of charging a condenser only as and after a considerable number of data pulses and gates coincide is utilized again to discriminate against spurious signals. In other words, data is not passed through the gates until a sizeable sampling confirms the existence of a true data signal.

After a character is scanned and its existence or nonexistence is established, the character detector is reset.

In a tag-card punch code converter 44, during the time the scanning system is between characters, information from the character register is utilized to pull over a flip-flop by which means the desired information is stored temporarily. The outputs of the flip-flops drive a diode matrix circuit which translates the 4-bit code into a 10-bit code compatible with conventional key-punch tabulating machinery.

The output of the converter 44 conditions a power device which may be a group of thyratrons, relays or similar units to pick up the appropriate punch magnet or magnets 48 for punching cards. These units are then held in readiness to perform the punching operation which occurs only after all information has been fed to the relays or thyratrons. This is necessary to make certain that all necessary information has been stored before the actual punching of the card takes place.

An end of block detector 50 is also incorporated in the apparatus. A hole, large in comparison to the character data holes in the tag, is punched adjacent the end of each tag and at the zero level. A large dark spot is created on the tape at each such point. It has previously been stated that a capacitor in the character detector 38 is gradually charged to a predetermined value by the occurrence of a large number of pulses from continued scanning of data spots. When the large dark spot is similarly scanned, the output of the character detector is sustained for a much longer period of time. An RC network in the end of block detector is then charged sufficiently by this longer signal to trigger a thyratron 52 which in turn actuates a card feed magnet 54 which causes the key-punch machine to feed in a new card to be punched.

The output of the end of block detector 50 is also fed to a character count check circuit 56. The check circuit 56 includes the program card of the key-punch machine. The program card has holes punched at one of its levels in every column except the twentieth and twenty-fifth columns. The program card is so set up because all blocks of information from the tags contain either a 20 or 25 character total, depending upon the type of tag used. Therefore, if a number of characters other than 20 or 25 have been punched in the card of the key-punch machine, the pulse from the end of block detector 50 will pass through the erroneously punched hole in that card to energize a thyratron 58 to sound an alarm and shut down the machine by means of an error check relay and machine-stop circuit 60.

A character check circuit 64 provides still another error detection system. The check circuit 64 is actuated from the character register 42, and it is organized about a diode matrix which detects the presence of more than two bits of information stored in the flip-flops previously mentioned as forming a part of the character register 42. Upon detection of such an error, the check circuit 64 triggers the thyratron 58 to close an error warning relay and to stop the machine in the same manner as this is done by the character count check circuit 56. A check reset 62 is provided to permit resumption of operations after the error is cleared.

FIG. 2 is a logical diagram of one system of processing the data pulses derived from the dark spots on the heat-sensitive tape, namely, the system in which the zero bit is used to indicate the presence of a valid character to be read. The data pulses are applied to the logic through the channel legended "Signal." In addition to the signal channel, a "Sync" channel is also provided. To the sync channel there is applied the negative pulse which is derived, as previously noted, as each radial slot passes the top edge of the tape, whether or not there are reflecting dark spots on the heat-sensitive tape. The negative pulse so derived is amplified in a suitable amplifying unit 101 and inverted in an inverting unit 102. The output of the inverter 102 is applied to a single shot multivibrator 103 which provides an output pulse of sufficient width to mask any positive overshoot which may be present in the negative pulse from the tape edge. The clean output pulse of single shot 103 is then applied to another single shot multivibrator 104. The output of the multivibrator 104 is a relatively wide pulse compared to that of the single shot 103. It is passed through a cathode follower 105 and then to an "AND Gate" 106. The duration of the output pulse from the single shot 104 is about three times the time needed for a radial slot to scan a single dot. Thus, the AND Gate 106 is open for a considerable time to pass signals resulting from scanning of the zero bit and arriving at the AND Gate 106 in the manner described below.

Other reasons for using the single shot multivibrators 103 and 104 are to obtain the desired shape of pulse and, more important, to delay the occurrence of opening the AND Gate 106 from the time the radial slot passes the edge of the tape until it reaches and is scanning the zero bit. The output of the single shot multivibrator 104 being, as noted, a pulse three times as wide in time as the time needed for the slot to scan a dot permits proper operation despite discrepancies in spot location, tape size and location or the like.

As the radial slot passes down the length of the fixed vertical slot and encounters the zero level on the tape, let it be assumed that a dark spot is present. The zero bit thus indicates the presence of a character to be read in the column being scanned and causes production of a signal pulse to be applied to an amplifier 107 in the signal channel. The signal so generated is further amplified by an amplifier 108 and passed through a cathode follower 109. The output of the cathode follower 109 is also applied to the AND Gate 106. Because of the delay provided by the single shot multivibrators 103 and 104, an output pulse will be obtained from the AND Gate 106 whenever a sync pulse developed by the edge of the tape coincides with a zero bit pulse denoting a character to be read.

Assuming then, that these conditions prevail and a character is to be read, a signal is passed through the AND Gate 106, to a detector circuit 110 where they are summed up in an RC network. Actually, a predetermined number of pulses must appear in succession before the detector circuit will signify that a valid character is ready to be presented to the rest of the logic. Because the speed of the tape is much slower than that of the slotted disc of the scanning device, such a number is obtained. Parenthetically, it should be noted that, although the rotating disc is driven by a synchronous motor, the drives of the tape feed and the rotating disc are purely asynchronous one to the other. Nevertheless, a few hundred radial slots in the scanning disc pass the scanning point in the time it takes to pass a single character column past the lens system. Hence, it may be postulated that two or three hundred pulses are available at the output of the AND Gate 106 for each character that is read.

In any event, as soon as 40 or 50 of any other desired predetermined number of the zero bit pulses are applied to the detector circuit 110, a Schmidt trigger circuit 111 is energized. The output of the Schmidt trigger circuit 111 is applied to a cathode follower circuit 112 and its output is applied to a second AND Gate 113. There is also applied to the AND Gate 113 the sync output from the cathode follower 105 and the amplified original signal from the cathode follower 114. The output of the cathode follower 105, it will be recalled, is the relatively wide pulse from single shot 104. The branch circuit terminating in the cathode follower 112 may be called the character detector in that its function is to ascertain he presence of a valid characer.

Subsequent pulses coinciding with the gate pulse set up by the single shot multivibrator 105, unlike those previously passed only through the AND Gate 106, are now able to pass through the AND Gate 113. Thus, all zero bit pulses after about the 50th in a typical arrangement are passed to an amplifier 115 which serves to reset their direct current levels. The output of the amplifier 115 is inverted in the unit 116 and then applied to a single shot multivibrator 117 which produces a gate lasting from the end of the zero bit to the beginning of the 7 bit. The output of the single shot multivibrator 117 is utilized to set off a chain of delayed pulses on additional single shot multivibrators, each delayed pulse being later in time than its predecessor. The pulses are produced by the single shot multivibrators 124, 125, 126, 127, 128, 129 and 130.

Now, the output of the single shot multivibrator 124 has a duration approximating that of the 7-bit signal. The AND Gate 133 will then only pass a signal if that signal coincides in time wtih the gate pulse from the multivibrator 124. This signal can, of course, only be that derived from the 7-bit, and a flip-flop 142 which is fed from the AND Gate 133 through an inverter 141 will change its condition only in response to the 7-bit signal.

Similarly, the single shot multivibrator 125 sets up a gate corresponding in time to the period between scanning of the 7 and the 4 bits. The single-shot multivibrator 126 sets up a gate corresponding in time to the 4-bit. The AND Gate 134 then passes only that signal corresponding in time to the gate from multivibrator 126, which is, of course, a 4-bit. The flip-flop 146, which derives its input through an inverter 143 from the AND Gate 134 can be changed in its condition only in response to a 4-bit signal.

The remainder of the single shot multivibrators 127, 128, 129 and 130 operate in similar fashion to change the condition of flip-flops 147 and 148 in response to signals representing the 2-bit and 1-bit, respectively, and to provide bit-spacing.

As an example, assume that a character being read is in fact a 4. In these circumstances, only the flip-flop 146 would be changed in condition. As a result, a cathode follower 150 to which one output of the flip-flop 146 is connected is energized. The other output of the flip-flop 146 is connected to a cathode follower 151 to which an output is fed if the flip-flop has not changed its state of conduction.

In the 7-bit channel, the outputs of the flip-flop 142 are similarly applied to cathode followers 152 and 153; in the 2-bit channel the output of the flip-flop 147 is fed to cathode followers 154 and 155; and, in the 1-bit channel the output of the flip-flop 148 is fed to the cathode followers 156 and 157. However, if a digit "4" is being read, only the "4" channel is energized and only the flip-flop 146 reverses its state of conduction, and only the cathode follower 150 would be positively energized. The other right-hand cathode followers, namely 152, 154 and 156, would not be energized, the positive signal in those instances being upon the cathode followers 153, 155 and 157.

The output side of the cathode follower 150 is connected to a trunk line which leads to an AND Gate 160, which is the gate for the 4 character of the key-punch machine. For simplicity, the various punch magnets and their associated thyratron are grouped in broken lines and legended 1 through 10 in accordance with the character which they are designed to punch in the tabulating cards. Also, connected to the AND Gate 160 are the left-hand cathode followers of each of the other flip-flops, namely cathode followers 153, 155 and 157. Thus, the AND Gate 160 has a positive output because all four of the signals applied to it are positive. Conversely, no other AND Gate associated with a punch magnet has only positive signals applied to it under these circumstances.

The output of the AND Gate 160 is applied to one grid of a thyratron 162 or one set of contacts of a relay, as the case may be. No other thyratron of the group associated with the punching mechanism has a similarly energized grid in the situation outlined. Voltage must also be applied to the other grid of the thyratron, or to the other set of relay contacts, before the key-punch operates. This voltage is derived from a single-shot multivibrator 169 which provides the necessary pulse of voltage after the Schmidt trigger 111 resets, after all the bits of a character have been read. The pulse from the single-shot 169 is applied to one grid of all the thyratrons simultaneously, and only that thyratron whose other grid is also energized will fire. The relays, if used instead of thyratrons, may be latch relays, one set of contacts of which will be held closed, just as one grid may be held energized momentarily. The common pulse will then cause power to be applied to the appropriate punch.

The operation of the components for punching other characters is identical to that described above and will not be recited in detail to avoid unnecessary repetition. Of course, where the digit to be punched is 1, 2, 4 or 7, only a single flip-flop is changed in condition. In the case of other digits, where a combined output is required, the situation remains basically the same.

Consider, for example, the digit 6 to be punched by the tabulating machine. Here, the flip-flops 134 and 135 would be changed in state of conduction and the positive output would be from the cathode followers 150 and 154. This would apply a positive input from cathode follower 150 to the 2-input AND Gate associated with the punch magnet #6, and a positive input from the cathode follower 154 to the second input of that AND Gate. All other flip-flops would remain unchanged and no other AND Gate would be enabled. Hence, the punch pulse from the single-shot 169 would cause only the punch magnet #6 to be actuated.

Several of the check circuits have been mentioned above in the broad description of the invention. One of these is operated by the Schmidt trigger 111. Dark spots signifying data characters energize the Schmidt trigger for a given period. However, the large dark spot adjacent each end of the block information impressed on the tape from each tag causes the Schmidt trigger to be energized for a far longer period. A detection circuit 170 is connected to the Schmidt trigger 111, and it includes an RC network which charges continuously as long as the Schmidt trigger is energized. During the scanning of data character spots, the Schmidt trigger drops back to its quiescent state a considerable length of time before the RC network of the detector 170 charges to any great degree. Because of the longer duration of the large dark spot, however, the RC circuit becomes charged to a value sufficient to trigger a thyratron 171 (in a block legended X), which energizes a magnet in the tabulating machine to cause a new card to be fed into the punch.

The card-feed pulse is also sent through a rectifier 172 to the program card 173 of the tabulating machine. If the pulse passes through the program card, which can only occur if an erroneous number of punches are made in the tabulating card, a thyratron 174 is triggered to stop the machine, given an alarm, or both. A reset switch 175 is provided to resume operations after the error is cleared.

The final check circuit is the character check circuit which detects the presence of more than two bits of information stored in the flip-flops 142, 146, 147, and 148. To perform this check, AND Gates 176, 177, 178 and 179 are provided. One input to the AND Gate 176 is derived from the cathode follower 150 associated with the flip-flop 146. Similarly, the AND Gate 177 has one input fed from the cathode follower 152 of the flip-flop 142. The other inputs of both AND Gates are fed in common from the AND Gate associated with the #3 tabulating machine punch magnet.

Thus, considering AND Gate 176, if the flip-flop 146 representing the character "4" on the tag were changed in condition, one positive output would reach the AND Gate 176. If, in addition, the AND Gate associated with the #3 punch magnet were to provide a positive signal to the other input of the AND Gate 176, the gate would open, and the thyratron 174 would be triggered to give an alarm through an OR Gate 180. Because the #3 punch could only be actuated by changes of condition of both flip-flops 147 and 148 (tag characters 1 and 2), the opening of the AND Gate 176 can occur only by the error of three flip-flops, namely flip-flops 146, 147 and 148 changing condition.

Similarly, the AND Gate 177 opens only if flip-flops 147 and 148, which trigger the #3 punch magnet, plus flip-flops 142 are changed. The AND Gate 178 is opened only by actuation of the #0 magnet (by character 7 flip-flop 142 and character 4 flip-flop 146), to which the AND Gate 177 is connected, plus the flip-flop 147. The AND Gate 179 is opened only by similar actuation of the #0 magnet plus a change of condition in the flip-flop 148. Opening of either AND Gate 178 or 179 results in the firing of the error thyratron 174, the pulse being passed through an OR Gate 181.

The OR Gates 180 and 181 prevent triggering of the error thyratron when both AND Gates of either pair are opened or enabled. Thus, the four possible conditions of having erroneous information stored in the flip-flops are checked. Should any of these conditions arise, the machine is shut down and an alarm is given by the thyratron 174 actuating the error warning system.

Various modifications of the system within the scope of the invention may easily be made. For example, the use of the zero bit as a sync track may be dispensed with. In that instance, it is necessary only to change the original sync gate from one which opens only to the width of slightly more than the time taken by the scanner to pass over the zero bit to a gate having a width slightly greater than the time taken by the scanner to pass over the entire five bits or levels on the tag. Then, data pulses from any two of the bits are used to charge the condenser in the character detector. The RC circuit is arranged so that the signals from two bits are necessary to charge the condenser sufficiently to open up the character detector. Although it is electrically possible that one very strong signal could cause opening up of the character detector, this would be detected in the chuck circuits at the character register because two signals would be lacking there.

When the character detector opens up in response to the signals from two bits, the string of single-shots is opened up and gates are opened for the 7, 4, 2 and 1 digits. The same amplified signals are sent into these gates as in the other system. The fifth level or zero bit is used only with the 7, 4, 2 and 1 digits in order that these, as well as the other digits, will be represented by two punched holes and two signals corresponding to those holes. In other words, the fifth level is only a redundant bit, providing a second hole where the code would not, of itself, require one to identify the character.

A gate is provided for the zero hole, and the check circuit is modified to make certain that two and only two characters are represented in the flip-flops.

It has previously been stated that relays may be used in place of the double grid thyratrons to actuate the punch magnets of the tabulating machine. These are preferably latch relays which are picked up in response to a data character signal and held in position until the character detector resets. Resetting of the character detector triggers a single-shot as previously explained, and the circuit which is completed by the lifting of the latch relays is then energized at the termination of the pulse from the single-shot. Power being thus applied, the tabulating machine card is then punched. The operation is entirely analogous to that described in connection with the thyratron.

Still another modification within the scope of the invention may be incorporated in the apparatus. In addition to the various gates for the 7, 4, 2, 1 (and 0, in the alternative embodiment) there are also single-shots which separate the various digits, such as gates 125, 127 and 129.

These gates may be fed back to the signal amplifier to clamp out the input signal. The amplifier is reset to a zero level during the period between actual character pulse reading. The use of this device provides an improved signal-to-noise ratio. This is helpful because the light variation across the tape varies and gives a signal pattern which is not at a fixed level. The clamping action of the feedback gates and the resetting of the amplifier between the reading of each digit overcomes the difficulty outlined.

The character check circuits have previously been described as working in conjunction with the 26th column of the program card on the tabulating machine. Depending upon the type of tabulating machine used, this may actually be a contact provided at the back of the machine (e.g. in a Remington-Rand tabulating machine) or in the program drum (as in the International Business Machines tabulating machine). This check circuit goes further than checking only the characters; inherently, it checks the operation of the tabulating machine itself to make certain that the tabulating machine actually got to the 26th column.

Although a heat-sensitive paper is preferred for the temporary storage of data because of its relatively low cost and the low cost of the converters for transferring data from tags to the tape, it is not necessary that holes exist in the tags from which the data is transferred to the tape. The nature of the tape is such that various ink patterns could be used to form the desired darkened pattern on the tape. Further modifications in the converter to accommodate such signals as would be derived from the ink patterns would then be made, if such changes were necessary.

References have been made throughout the specification to "AND Gates," "OR Gates," "Flip-Flops," "Schmidt Triggers" and other components which are now conventional in the computer art. These generic terms may in most cases, refer to any of several specific arrangements of components which function to produce the operations ascribed to them in the foregoing operational description. The invention should be limited only by the spirit and scope of the appended claims.

What is claimed is:

1. Data conversion apparatus for producing punched tabulating cards containing data comprising a length of heat-sensitive tape, impressions being formed on said tape representing said data, means for directing light upon said tape, photoelectric means for detecting light reflected from said tape, means for producing a synchronizing pulse in response to the difference in reflection of said light from the leading edge of said tape and the background thereof, means for producing signal pulses from the difference in reflection of light from said impressions on said tape and said tape (gates for permitting the punching of said tabulating machine cards), and means responsive to said synchronizing pulse for opening said gates for passing said signal pulses to cause punching of said cards.

2. In data conversion apparatus, means for converting information in the form of dark areas on various levels of a tape into tabulating machine cards having said information coded therein in the form of puched holes comprising photoelectric means for scanning said tape and producing a synchronizing pulse as the leading edge of said tape is scanned and signal pulses as levels of said tape containing said dark areas are scanned, means for amplifying the output of said photoelectric means, means for setting up gates spaced in time an amount equal to the spacing of said various levels from said leading edge of said tape, and means for punching holes in said tabulating cards in response to said amplified signals formed by said photoelectric means as dark areas in said levels are scanned.

3. Apparatus as in claim 2 including means for delaying the setting up of said gates until a predetermined number of said signals are produced by said photoelectric means.

4. Apparatus as in claim 3 including means for checking and detecting the number of holes punched in said tabulating machine cards, and means responsive to said last-mentioned means for discontinuing operation of said data conversion apparatus in response to the detection of a predetermined number of punched holes.

5. In data conversion apparatus, means for punching tabulating machine cards in a code determined by the pattern of dark spots on a length of tape comprising a flying spot scanner for scanning said tape, a photoelectric pickup for producing a synchronizing pulse as said scanner passes the leading edge of said tape and for producing signal pulses in response to the presence of dark spots at various levels of said tape, a character detector connected to said pickup, means responsive to said synchronizing pulse for setting up a gate to pass signals resulting from dark spots detected by said pickup to said character detector, means in said character detector for accumulating a predetermined number of said signals, means for setting up a series of gates spaced in time an amount equal to the spacing of said various levels from said leading edge of said tape, said last-mentioned means being operative only in response to the accumulation of said predetermined number of said signals in said character detector, and means for actuating said punching means in response to signals passing through said series of gates.

6. Apparatus as in claim 5 wherein said means for actuating said punching means comprises a series of flip-flops, means for changing the condition of operation of each of said flip-flops in response to a signal passing through one of said series of gates, means for detecting the condition of operation of said flip-flops, punching magnets for punching holes in said tabulating machine cards, and means for selectively energizing said punching magnets in accordance with the condition of operation detected in said flip-flops.

7. Apparatus as in claim 6 including an alarm system for discontinuing operation of said data conversion apparatus and means for triggering said alarm system in response to erroneous conditions of operation detected in said flip-flops.

References Cited in the file of this patent

UNITED STATES PATENTS

| 2,224,763 | Dickinson et al. | Dec. 10, 1940 |
| 2,275,396 | Johnson | Mar. 3, 1942 |
| 2,543,435 | Buckley | Feb. 27, 1951 |
| 2,711,794 | Ghertman | June 28, 1955 |
| 2,798,959 | Moncrieff-Yeates | July 9, 1957 |
| 2,838,115 | Davis | June 10, 1958 |
| 2,844,733 | Miller et al. | July 22, 1958 |
| 2,894,247 | Relis | July 7, 1959 |